(12) United States Patent
Soerensen (10) Patent No.: US 12,352,237 B2
(45) Date of Patent: Jul. 8, 2025

(54) WIND TURBINE

(71) Applicant: Siemens Gamesa Renewable Energy A/S, Brande (DK)

(72) Inventor: Johnny Soerensen, Videbaek (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/708,402

(22) PCT Filed: Nov. 9, 2022

(86) PCT No.: PCT/EP2022/081272
§ 371 (c)(1),
(2) Date: May 8, 2024

(87) PCT Pub. No.: WO2023/088748
PCT Pub. Date: May 25, 2023

(65) Prior Publication Data
US 2025/0012256 A1    Jan. 9, 2025

(30) Foreign Application Priority Data

Nov. 19, 2021 (EP) .................................. 21209330

(51) Int. Cl.
| | | |
|---|---|---|
| *F03D 13/10* | (2016.01) | |
| *F03D 1/00* | (2006.01) | |
| *F03D 1/06* | (2006.01) | |

(52) U.S. Cl.
CPC ........... *F03D 13/122* (2023.08); *F03D 1/125* (2023.08); *F03D 1/06* (2013.01); *F05B 2240/916* (2013.01); *F05B 2260/301* (2013.01)

(58) Field of Classification Search
CPC .... F03D 12/122; F03D 12/125; F03D 12/808; F03D 12/82; F03D 12/821; F03D 12/88;
(Continued)

(56) References Cited

U.S. PATENT DOCUMENTS

| | | | |
|---|---|---|---|
| 9,041,236 B2 * | 5/2015 | Larsen ..................... | F03D 80/82 290/55 |
| 11,946,446 B2 * | 4/2024 | Baun ....................... | F03D 80/88 |

(Continued)

FOREIGN PATENT DOCUMENTS

| | | |
|---|---|---|
| EP | 2520792 A1 | 11/2012 |
| EP | 3276169 A1 | 1/2018 |

(Continued)

OTHER PUBLICATIONS

EP_3293393_Translation (Year: 2018).*

(Continued)

*Primary Examiner* — Brian P Wolcott
(74) *Attorney, Agent, or Firm* — Schmeiser, Olsen & Watts, LLP (57) ABSTRACT

A wind turbine is provided, including multiple wind turbine blades fixed to a rotor hub, a nacelle to which the rotor hub is mounted, and a tower carrying the nacelle, wherein wind turbine components are housed in a housing of the nacelle, wherein a mounting device is provided inside the nacelle, the mounting device providing at least two module receivers, wherein at least two first modules each including at least one of the wind turbine components are each detachably mounted in a respective module receiver, and wherein the housing includes, for each module receiver, a closable access opening.

13 Claims, 5 Drawing Sheets

(58) Field of Classification Search
CPC ............... F03D 12/881; F05B 2230/60; F05B 2230/601; F05B 2230/61; F05B 2240/14; F05B 2240/40
See application file for complete search history.

(56) References Cited

U.S. PATENT DOCUMENTS 12,044,216 B2 * 7/2024 Raimund ................ F03D 1/141
12,110,873 B2 * 10/2024 Filsoof .................. F03D 80/881

FOREIGN PATENT DOCUMENTS

| EP | 3293393 A1 * | 3/2018 | ............. B66C 1/108 |
|---|---|---|---|
| EP | 3875758 A1 | 9/2021 | |
| EP | 4039968 A1 | 8/2022 | |
| KR | 20150137132 A * | 12/2015 | |
| WO | 2011117005 A2 | 9/2011 | |
| WO | 2021228344 A1 | 11/2021 | |

OTHER PUBLICATIONS

KR_20150137132_Translation (Year: 2015).*
PCT International Search Report & Written Opinion mailed Feb. 13, 2023 corresponding to PCT International Application No. PCT/EP2022/081272.

* cited by examiner

WIND TURBINE

CROSS-REFERENCE TO RELATED APPLICATIONS

This application is a national stage of PCT Application No. PCT/EP2022/081272, having a filing date of Nov. 9, 2022, which claims priority to EP application Ser. No. 21/209,330.6, having a filing date of Nov. 19, 2021, the entire contents both of which are hereby incorporated by reference.

FIELD OF TECHNOLOGY

The following relates to a wind turbine, comprising multiple wind turbine blades fixed to a rotor hub, a nacelle to which the rotor hub is mounted, and a tower carrying the nacelle, wherein wind turbine components are housed in a housing of the nacelle.

BACKGROUND

Wind turbines are mostly known for the production of electrical power, for example as a part of wind farm. However, recently, it has also been discussed to use wind turbines for the production of hydrogen. Wind turbines usually comprise a tower, onto which a nacelle is rotatably mounted. The nacelle comprises a rotatable rotor hub, to which wind turbine blades are mounted, for example three wind turbine blades. In the nacelle, a generator generating electric power upon rotation of the rotor and a transformer may be housed among other components. Further components housed in the nacelle may comprise shift gear, inverters, control electronics and the like.

Generally, a lot of components are usually housed in the nacelle of a wind turbine, some of which are very heavy and complicated to handle. Components, in particular if they are defective, may need servicing and/or maintenance. For example, a transformer may be prone to blackouts. To be able to access or, in particular, exchange such a component, it has been proposed to place it at a better accessible position in the wind turbine, for example at the back. However, this may limit the accessibility of other components.

For adding, removing or replacing components, hoist systems have been proposed, in particular also hoist systems integrated into the nacelle. For example, in EP 2 520 792 A1, a hoist system for hoisting a wind turbine component down from or up to a nacelle of a wind turbine has been proposed, which comprises an opening in the lower part of the nacelle to the outside. A winch with a winch cable is provided, to which the component can be attached such that the wind turbine component may be lowered or raised to the opening in the nacelle by the winch.

However, for some components, they are still complicated to access, uninstall and hence allow to hoist them. The same applies to installation of a new component. In known approaches, servicing and maintenance regarding components in the nacelle of a wind turbine is hence time-consuming, complicated and may require long downtimes of the wind turbine.

SUMMARY

An aspect relates to a wind turbine having an improved nacelle design regarding servicing and maintenance of components housed in the nacelle, in particular to minimize wind turbine downtime.

In a wind turbine as originally described, a mounting device is provided inside the nacelle, the mounting device providing at least two module receiving means or module receivers, wherein at least two first modules each comprising at least one of the wind turbine components are each detachably mounted in a respective module receiving means, and wherein the housing comprises, for each module receiving means, a closable access opening.

Hence, a modular approach is proposed to place components inside the nacelle, allowing for easy installation and placement of individual first modules, for example by lifting or otherwise moving such modules out of the nacelle via the access opening. Here, as will be discussed in detail below, the access opening may be on the top of the nacelle, at a side of the nacelle, or even in the bottom of the nacelle.

The installation/removal/exchange of a module is performed through the access opening in the nacelle housing (which may also be called canopy), wherein the access opening may be closable by a hedge or similar cover element. However, in an embodiment, the access opening may also be closed by an outer surface of the first modules. In other words, the first modules may be designed to make up for the opening cover so that, when placed in the respective module receiving means, they complete the housing, such that the mentioned outer surface forms a part of the housing.

In this manner, accessing the first modules is even more simplified, since no separate closing elements need to be operated.

The first modules (or generally later discussed modules embodiments of the invention, for example second and/or third modules), may each comprise one or more components for operating a wind turbine. In other words, each module contains different equipment for operating the wind turbine. The component may, for example, be chosen from the group comprising a converter, a switch gear, a transformer, at least one hydraulic power pack (which may, for example, supply a hydraulics based blade pitch system), at least one control device and/or control cabinet, a power source (for example battery packs and/or an UPS backup system and/or a generator and/or fuel cells), an elevator (for example an internal elevator of the nacelle or even an elevator system that allows travel through the tower to the foundation), a cooling device (for example a fan and/or a pump), and a service unit (for example comprising spare parts, tools and/or lubricants). If the wind turbine is used for generation of hydrogen gas, a module may also comprise an electrolyzer device and/or an electrolyzer support equipment as a component. Electrolyzer support equipment may, for example, comprise water desalination devices, compressor units, gas storage units and the like.

The nacelle is dedicatedly constructed to provide the mounting device, at least partially as part of the housing and/or a frame (mainframe) of the nacelle, such that easy access and handling of the first modules is provided. Therefore, the mounting device comprises module receiving means, one for each module, in particular comprising provided space for the first module and holding means or holder for the first module.

The herein described approach provides several advantages. Generally, the wind turbine, in particular the nacelle, according to embodiments of the invention is of a simpler design. Important components housed in the nacelle can be replaced in a short time, such that wind turbine downtimes can be reduced. Since the modules can be accessed from the outside through the access opening, the wind turbine provides good work security conditions, since heavy work in confined space can be reduced. In this context, when using respective hoisting equipment, personal can be positioned away from the first modules while they are moved.

Since modules are used, a standardization is provided, which allows more suppliers for first modules. The modules are easy to ship and to transport and may be stored for later insertion. For example, for a wind farm, replacement modules may already be stored close to the wind turbines or, in the case of offshore wind turbines, in a nearby harbour, such that a service vessel may transport a replacement module to the wind turbine, remove a module having a defective component, insert the replacement module in place of the removed first module, and the wind turbine can re-start its operation. Meanwhile, the replaced first module may be transported to the respective maintenance facility and be, for example, repaired.

Embodiments of the invention further allow a cost-efficient fabrication of the turbine, since modules can be installed late in the pre-installation location, for example harbour, if required. The modular approach further allows easier upgrading of the wind turbine, for example by providing modernized components in replacement modules. Generally, the modules, in particular the first modules, can be repaired individually and thus at different locations and assembled easy and fast in preparation of a complete nacelle, for example on site or at a pre-assembly site for transporting the complete nacelle to the intended installation location.

In principle, as soon as the first modules have been inserted into the respective module receiving means, the components may be manually connected to other components as required, using respective manual connection means or connector. In an embodiment, however, each first module comprises at least one module connection means for establishing a power connection and/or a data connection and/or a fluid connection and each module receiving means comprises at least one nacelle connection means such that, upon inserting a first module into the nacelle using the respective module receiving means, associated connection means are automatically connected. Additionally, as part of the module connection means or the nacelle connection means, connection guiding means or connection guide may be provided such that respective connection elements of the module connection means and the nacelle connection means meet when the first module is inserted into the respective module receiving means. In other words, a plug-and-connect system may be formed from the module connection means and the nacelle connection means such that interfaces are automatically connected when a first module is inserted and also automatically disconnected when a first module is removed. In this manner, plugs, wires, couplers, and/or other interfaces, for example concerning power transmission, communication and/or fluid access, are automatically connected, further reducing the effort and simplifying the installation and de-installation process for the first modules. An exemplary plaque-and-connect system, in particular for a switch gear, is disclosed in earlier-filed European patent application 21155490.2, which can also be used in embodiments of the present invention for establishing the connections of the various first modules.

In an embodiment, all first modules may comprise identical coupling means or coupler for coupling the first module to a hoisting means or hoist (hoisting equipment). Such coupling means may, for example, comprise a hook and/or loop connector to couple the respective first module to a crane, a winch cable, or the like. Providing each first module with such identical coupling means allows to handle all of them using the respective hoisting means. In some embodiments, the wind turbine, in particular the nacelle, itself may comprise at least one of the at least one hoisting means.

For example, the wind turbine may comprise a winch and/or a crane in the nacelle as at least one of the at least one hoisting means. A winch may, for example, be used to lower first modules (or further modules) through an access opening in the lower part of the nacelle, as described for instance in EP 2 520 792 A1. In other embodiments, a hoisting means integrated into the nacelle may also be a crane. For example, such cranes have already been proposed in the interior of the housing of the nacelle and configured to be moved into an operation position, where the crane at least partly extends out of the housing, in particular at the top of the nacelle. In embodiments, such a crane may be built into the nacelle at a rotor hub side of the nacelle housing, in particular adjacent to the first modules.

Using such an integrated hoisting means, in particular a crane, at least some of the first modules can easily be raised to or lowered from the nacelle. In embodiments, a nacelle crane can hoist/exchange the lighter first modules, but may also be designed to have a high lifting capacity. That is, the crane in the nacelle can be upgraded to heavy lifting capacity to be able to hoist all the first modules. In another embodiment, if the weight of a first module exceeds the lifting capacity of the internal crane, external cranes may be used additionally. Such external cranes or other external hoisting means may be ground-based, or vessel-based if the wind turbine is located offshore.

In an embodiment, the mounting device comprises at least one frame defining mounting positions for the first modules received by each module receiving means. For example, a nacelle frame also carrying cover elements for the housing of the nacelle may be configured to also serve as part of the mounting device, for example by positioning and spacing beams and/or bars of the frame such that spaces for receiving one of the first modules result, in particular one of these spaces for each module receiving means. If the nacelle housing frame (main frame) is adapted accordingly, no additional elements have to be added, but simply the frame of the nacelle carrying the housing modified.

In an embodiment, the first modules are attached to the frame by detachable attachment means or detachable attachment, in particular comprising bolts. For example, the first modules may be inserted into their respective module receiving means and then be attached to the frame as part of the mounting device. In embodiments, if the frame is configured to hold a first module before attaching it using the attachment means, in particular such that at least one bearing surface of the first module rests against a bearing surface of the frame. That is, the frame, in particular its respective parts belonging to the respective module receiving means, may be adapted to support the first modules on its own, without having to use the attachment means. For example, and further described below; the first modules may be suspended in the frame. In this manner, a hoisting means, for example a crane, may already be disconnected before the attachment means have been applied. For example, the hoisting means may already be used for another lifting procedure while the first module is being attached to the frame.

In a lesser alternative, but also part of embodiments of the current invention, a first module can be secured to the frame while hanging suspended from the hoisting means, in particular a crane, until a secure attachment has been established. However, in this case, the hoisting means cannot be used elsewhere while the module is secured to the frame.

In embodiments, in particular if an outer surface of the first modules forms part of the housing of the nacelle, a sealing and/or damping means or damper may be positioned between the bearing surfaces. This is particularly advantageous if the first modules are suspended in the frame with the access opening to the top. But also in other embodiments, a sealing and/or damping means between the first module and the frame may be used. In this manner, a better protection of the interior of the nacelle from environmental conditions is provided. In embodiments, a sealing means or seal may be of an elastic nature, such that it may additionally function as a damping means. By using a damping means, shocks may be absorbed, in particular also while inserting or removing the first module.

In embodiments, each module receiving means may comprise an insertion guiding means or insertion guide for guiding a first module to be inserted to its mounting position. For example, guide rails and/or guide surfaces may be provided as insertion guiding means. In this manner, easy positioning is provided. While the insertion guiding means may be a permanent part of the mounting device, for example as part of or secured to the frame, in other embodiments, external insertion guiding means may be provided for the mounting device, which may, for example, be detachably attached to the frame and be used for multiple module receiving means.

In an embodiment, the frame may have upper frame openings for each module receiving means and each first module may have a body of smaller dimensions than the frame openings and an upper flange of dimensions larger than the frame openings, such that the first modules rest suspended in the mounting position with the flange resting on the rim of one of the frame openings. That is, the underside of the flange is a bearing surface of the first module and the frame surface around the frame opening, i.e., the rim of the frame opening, forms a bearing surface of the frame. The flange may be attached to the frame using the attachment means, in particular bolts. In embodiments, in such an embodiment, sealing and/or damping means are especially desired.

In other words, the top of the first modules may comprise a flange which is of larger dimension compared to the frame openings into which they are inserted. In embodiments, a guiding system may ensure easy positioning in the frame openings. For example, a detachable guiding means guiding a first module into a frame opening may be provided. For example, such a detachable guiding means may be mounted to the top of the nacelle. After a respective first module has been inserted and hangs suspended in the respective frame opening, it may be secured to the frame by the attachment means, for example by bolting.

In this embodiment, where the frame supports the first modules suspendedly in frame openings, the access opening is on the top of the nacelle and may for example be closed by the upper surface of the respective first modules, wherein sealing to the outer parts of the housing of the nacelle may be provided by the sealing and/or damping means. If one module receiving means is to be left empty, a cover plate may be used in the frame opening.

In this first embodiment, the first modules may be lifted to above the nacelle and may then be lowered into the respective frame openings, until the flange rests on the rim of the frame openings. To remove a first module, hoisting means may simply be coupled to the respective first module, in particular via the coupling means, and the first module can easily be lifted out of the top of the nacelle. This first embodiment is a simple construction, since no complicated mechanical elements are required and the module receiving means may simply be provided by a corresponding construction of the frame.

In a second embodiment, which may also be combined with the first embodiment, each module receiving means may comprise a telescopic mounting arm which can be prolonged in a telescopic manner to a receiving position outside the nacelle and shortened to move a respective first module into the mounting position in the nacelle. To remove a first module, it is moved from the mounting position inside the nacelle to the receiving position (in this case removing position) outside the nacelle by extending the telescopic mounting arm. For example, two such telescopic mounting arms may be used, one on each side of the module receiving means. In an embodiment, in the prolonged position, the telescopic mounting arms extend through the access opening provided at a side of the nacelle or a back of the nacelle opposite the rotor hub. For example, if a frame is configured to be part of the mounting device, the frame openings may be provided in at least one side of the frame. In other words, the frame may also be equipped with a telescopic arms system, such that a first module can be pushed/pulled from the nacelle along these arms. Telescopic arms may, for example, comprise multiple elements each sliding and guided in the extension direction by another element, like, for example, known from drawers in furniture.

In this second embodiment, in particular if the first modules are moved into the receiving or removing position horizontally through a sideways of backwards access opening, the first modules only need to be lifted for insertion. When they are removed, they only have to be lowered. Hence, in embodiments, an internal hoisting the nacelle, for example a crane or winch, can be used for lowering a first module even if its lifting capacity is not sufficient for actually lifting it. For lifting, an external hoisting means, for example an external crane, may be employed. In embodiments, if a frame is used, this second embodiment can be understood as a sort of rack like known, for example, from computer technology, where different first modules may simply be inserted and removed from the side, in particular using a simple telescopic arms system. In this case, the attachment means may at least partially be used to secure first modules to the telescopic arms.

Apart from the first modules received by corresponding module receiving the mounting device, in particular in the frame, further modules may be provided in and/or at the nacelle which are not received by module receiving the mounting device, but otherwise supported and/or mounted in and/or at the nacelle. It is noted that all remarks relating to connection means and/or coupling means for the first module may also be applied to the second and/or third modules discussed here.

For example, the wind turbine may further comprise at least one second module, which comprises at least one component, mounted to the outside of the nacelle. In embodiments, at least one of the at least one second module may be a cooling module, that is, comprise at least one cooling device. In embodiments, when ambient air is to be used by the cooling device, in particular a fan, placement in a second module position outside the nacelle housing, for example mounted to the top of the nacelle, provides ideal access to the ambient air. For example, such a second module may be mounted to the top of the nacelle using corresponding attachment means, for example comprising bolts. Since the second module is easily accessible, mounting, removing and replacement are facilitated.

Furthermore, the module receiving means may be located in an upper part of the nacelle, wherein at least one third module, which comprises at least one of the components, in particular a gear box module and/or a generator module, is placed below the first modules, in particular supported by a bedframe of the nacelle. Another example for a third module may be a drive train module comprising a drive train and/or at least partly a main shaft. In such embodiments, the first modules are dimensioned such that they allow for other, namely third, modules, in particular comprising more permanently placed components/equipment, below the suspended first modules. In embodiments, the first modules may be dimensioned and placed such that a person is allowed to stand underneath the first modules. In this manner, sufficient space is provided to allow servicing of the components of the third modules.

In such an embodiment, the access opening may be at the top of the nacelle such that the third modules are insertable and removable through the access opening when at least a part of the first modules are removed. If, for example, the third modules comprise a gear box module and a generator module and the first modules comprise a transformer module, a converter module and a control module, the generator may be placed below the transformer module and the converter module, such that, if these first modules are removed, access to the third module is provided through the access opening.

Further, the nacelle may comprise at least one staircase and/or platform, in particular at a side of the nacelle, to facilitate access to the first modules. In embodiments, persons may use the floor of the nacelle to access components of the third modules and may additionally use a staircase and/or ladder to access a platform, for example a walkway, which may be placed along a nacelle sidewall, such that the components of the first modules can also be accessed and serviced. In another embodiment, the first modules can also be placed close to a flooring optionally provided with openings allowing the first module to partly pass through, such that easy access to the first module is facilitated.

In a concrete embodiment, a first module comprising a transformer (transformer module), a first module comprising a converter (converter module), and a first module comprising control equipment (control module) may be located above a drive train/main shaft, a generator, which may in particular be part of a third module, and a gear box, which also may be part of a third module. The first modules may be suspended in mounting positions defined by respective module receiving means in a frame. As a second module, a cooling module may be located on the top of the nacelle, in particular at a rotor hub side of the top of the nacelle. In an embodiment, a hoisting means, in particular a crane, may also be provided inside the nacelle, in particular below the second module and on the rotor hub side of the first modules.

According to embodiments of the invention, also a method for maintenance of a wind turbine according to embodiments of the invention is conceivable, wherein a first module comprising a defective component is removed from the module receiving means and replaced by a first module comprising a respective working component. In embodiments, the removed first module may be transported to a maintenance location, where the component is repaired. Thereafter, the first module may either be stored at the maintenance location to be used as a replacement module for another module comprising a defective component or may be re-installed at the wind turbine where it was replaced, the interim replacement module being returned to the maintenance location.

This, as already discussed with respect to the wind turbine, allows easy, cost-reduced maintenance while minimizing the downtimes of the wind turbines.

BRIEF DESCRIPTION

Some of the embodiments will be described in detail, with reference to the following figures, wherein like designations denote like members, wherein.

DETAILED DESCRIPTION

Figure 1:
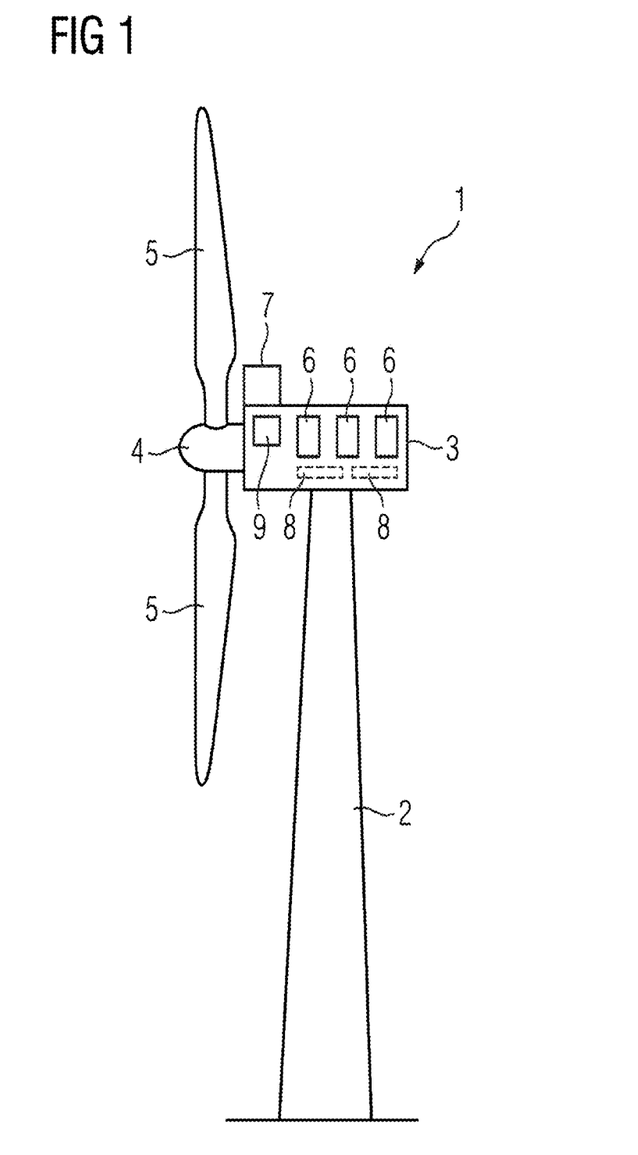
FIG. 1 shows a general schematic view of a wind turbine according to embodiments of the invention.

FIG. 1 is a schematical view of a wind turbine 1 according to embodiments of the invention. The wind turbine 1 comprises a tower 2 carrying a rotatably mounted nacelle 3. Via a rotor hub 4, in this case, three blades 5 are mounted.

In the nacelle 3 and in this case partly also on the nacelle 3, components of the wind turbine 1 are mounted in first modules 6, second modules 7 and optional third modules 8, as further explained below. Furthermore, an internal crane 9 as a hoisting means is also provided in the nacelle 3.

The wind turbine 1 may be an onshore wind turbine or an offshore wind turbine. If the wind turbine 1 is configured to provide electrical power, components in the nacelle 3 may, for example, comprise a gear box, a generator, switch gear, a converter, a transformer, at least one hydraulic power pack for blade tilting hydraulics, at least one control device and/or control cabinet, a power source, an elevator, a cooling device and/or a service unit. If hydrogen is to be produced using the wind turbine 1, components may further comprise an electrolyzer device and/or electrolyzer support equipment. Such components are in principle known and do not need to be further discussed here.

Figure 2:
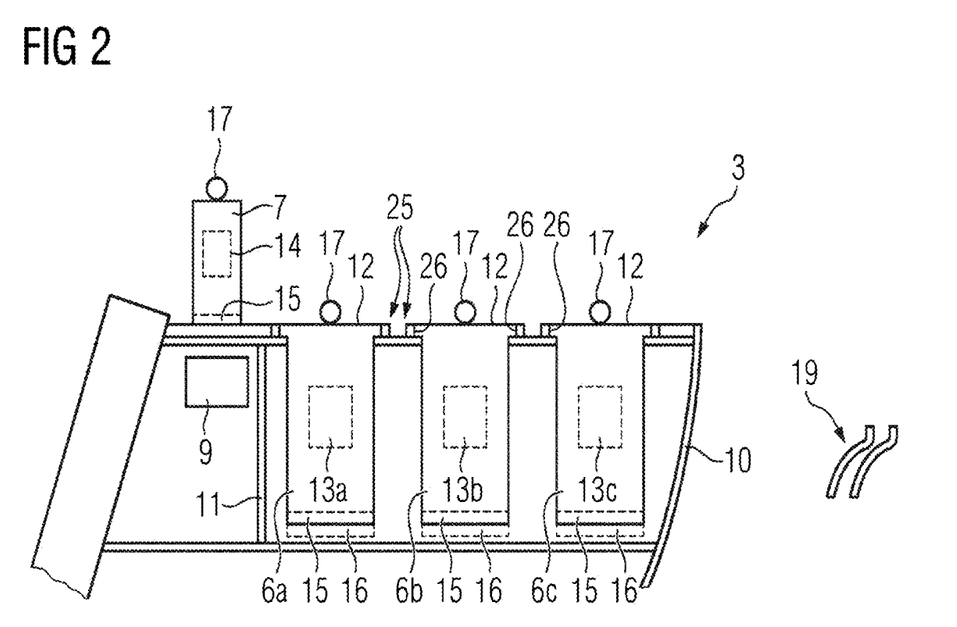
FIG. 2 shows a cross-sectional detail of a first embodiment of a nacelle of the wind turbine.

A first concrete embodiment of the nacelle 3 is shown in FIG. 2. Here, the nacelle 3 comprises a housing 10 having multiple cover elements. Access openings are provided at the top of the housing 10, wherein, in each of the here three access openings, a first module 6a, 6b, 6c has been inserted such that it rests suspended on a frame 11, which may be the main frame of the nacelle 3. That is, the frame 11 is configured to provide frame openings aligned with the access openings such that module receiving a mounting device are formed, wherein the modules 6a, 6b and 6c are received and mounted in a mounting position shown in FIG. 2. As can be seen, the outer surface 12 of the first modules 6a, 6b and 6c are level with the housing 10 and hence form part of the housing 10.

A second module 7 is mounted to the housing 10 on top of the nacelle. Third modules 8, if present, may rest below the first modules 6a, 6b, 6c, for example on the bedframe of the nacelle 3.

Each of the modules 6a, 6b, 6c, 7, and optionally 8 comprises at least one respective component 13a, 13b, 13c, 14, wherein, in this case, the component 13a is a converter, the component 13b is a transformer and the component 13c is a control cabinet with multiple control devices. Hence, the first module 6a may be termed converter module, the first module 6b may be termed transformer module and the first module 6c may be termed control module. It is noted that, generally, the first modules 6a, 6b and 6c may have the same size such that each first module 6a, 6b and 6c may be used with each module receiving means. In other embodiments, module receiving means may be configured to receive a special type of first modules 6, 6a, 6b, 6c.

The at least one component 14 is one or more cooling devices, such that the second module 7 may also be called the cooling module. If the at least one component 14 comprises fans, ambient air can be sucked in and/or cooling air can be exhausted easily.

Components of third modules 8 may in particular comprise a gear box, if provided, and/or a generator. These components may also be located below the first modules 6a, 6b and 6c without being part or forming a third module 8 themselves.

In the first embodiment and all further embodiments, although for simplicity not shown there, each module 6, 6a, 6b, 6c, 7, and optionally 8 comprises module connection means 15 for establishing a power connection and/or a data connection and/or a fluid connection, wherein the respective connection means 15 automatically connect with corresponding nacelle connection means 16 of the nacelle 3. That is, when a module 6, 6a, 6b, 6c, 7, and optionally also 8 is inserted or mounted into or at, respectively, their associated mounting position, the necessary connections are automatically established. In the case of the first modules 6, 6a, 6b, 6c, these connections are automatically established upon insertion into the respective module receiving means. The resulting system may be called "plug-and-connect system". Connection guiding means (not shown) may be employed, for example, in the nacelle 3.

As can be seen from FIG. 2, at least the first modules 6, 6a, 6b, 6c and the second modules 7 each comprise coupling means 17, for example a hook and/or a loop, to connect to hoisting means, for example the crane 9, such that they can be lifted from and to the nacelle 3 and/or to the ground/sea level, respectively.

Figure 3:
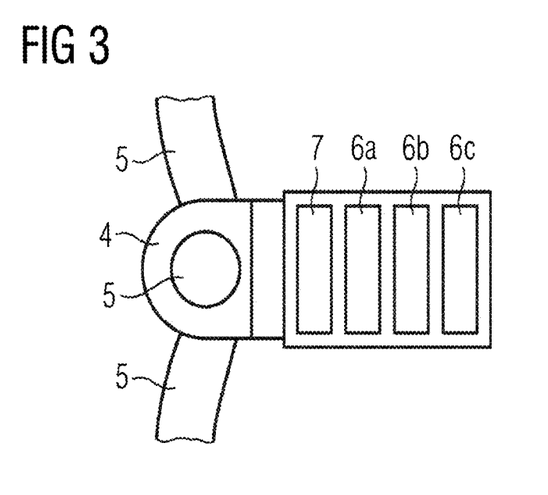
FIG. 3 shows a view from above onto the nacelle area in the first embodiment.

FIG. 3 shows a schematic view from above onto the nacelle area of the first embodiment. As can be seen, all modules 6a, 6b, 6c and 7 can be accessed from the top.

Figure 4:
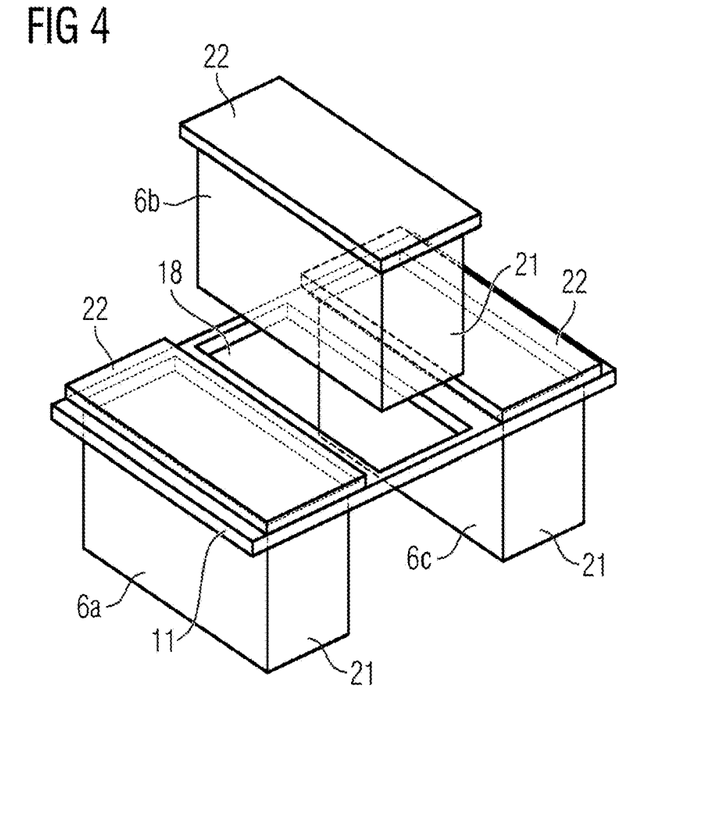
FIG. 4 shows a perspective view of a frame part and three first modules in the first embodiment.
Figure 5:
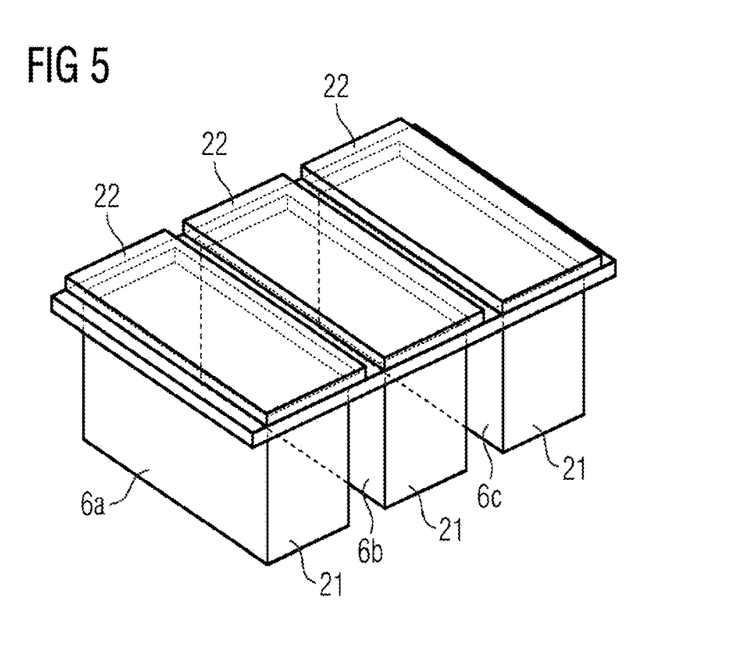
FIG. 5 shows a second perspective view of the frame part and the three first modules.
Figure 6:
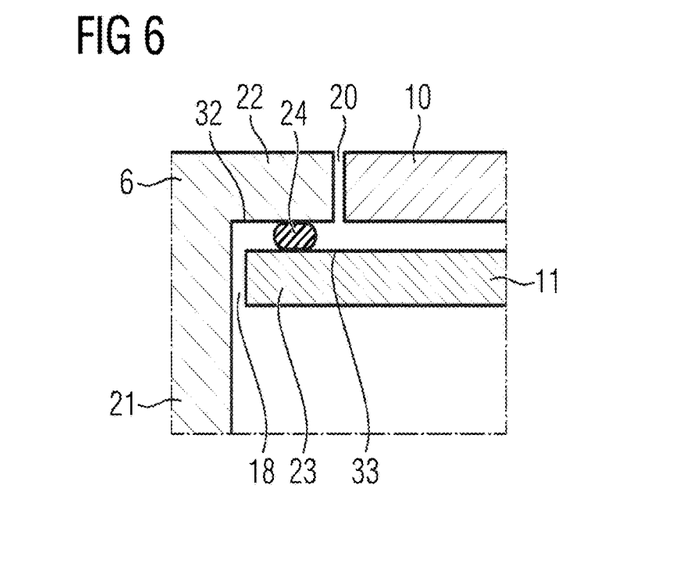
FIG. 6 shows a cross-sectional detail view of a rim of a frame opening and a flange of a first module.

FIGS. 4 and 5 show perspective views of a part of the frame 11 and the first modules 6a, 6b and 6c, while FIG. 6 shows a cross-sectional detail. In FIG. 5, the first module 6b is shown above the corresponding frame opening 18, in particular still attached to a hoisting means via the coupling means 17. It is hence ready to be inserted. To guide the insertion process, a detachable guiding means 19 indicated in FIG. 2 may be provided, for example comprising guide rails and/or guide surfaces, which can, for example, be mounted to the housing 10 adjacent the access opening 20 indicated in FIG. 6. To insert the first module 6b into its mounting position, it is lowered through the access opening 20 and the frame opening 18 into the nacelle 3. As can be seen, each module 6a, 6b and 6c has a lower body 21 having smaller dimensions than both the frame opening 18 and the access opening 20 and an upper flange 22 having larger dimensions than the frame opening 18, but smaller dimensions than the access opening 20. Hence, when the first module 6b is lowered to its mounting position, the flange 22 comes to rest on the rim 23 of the frame opening 18, such that the frame 11 supports the first module 6b (as the other first modules 6a, 6c) suspendedly. To provide sealing and damping, a sealing and damping means 24 is provided on the rim 23 of the frame opening 18, for example a sealing tape, strip or cord.

Once the first module 6b is supported by the frame 11, the hoisting means may be decoupled from the coupling means 17, in particular before attachment means 25, as indicated in FIG. 2 and in this case comprising bolts 26, may be used to secure the first module 6b to the frame 11 and hence the nacelle 3.

In the following embodiments, attachment means 25, sealing and damping means 24, coupling means 17 and connection means 15, 16 will not be shown again for simplicity, but may, of course, also be provided. Additionally, at least for the third and fourth embodiment, components will not be explicitly indicated, but are of course present in the respective modules 6, 7, 8. For simplicity, corresponding numerals will be used for corresponding technical features.

Figure 7:
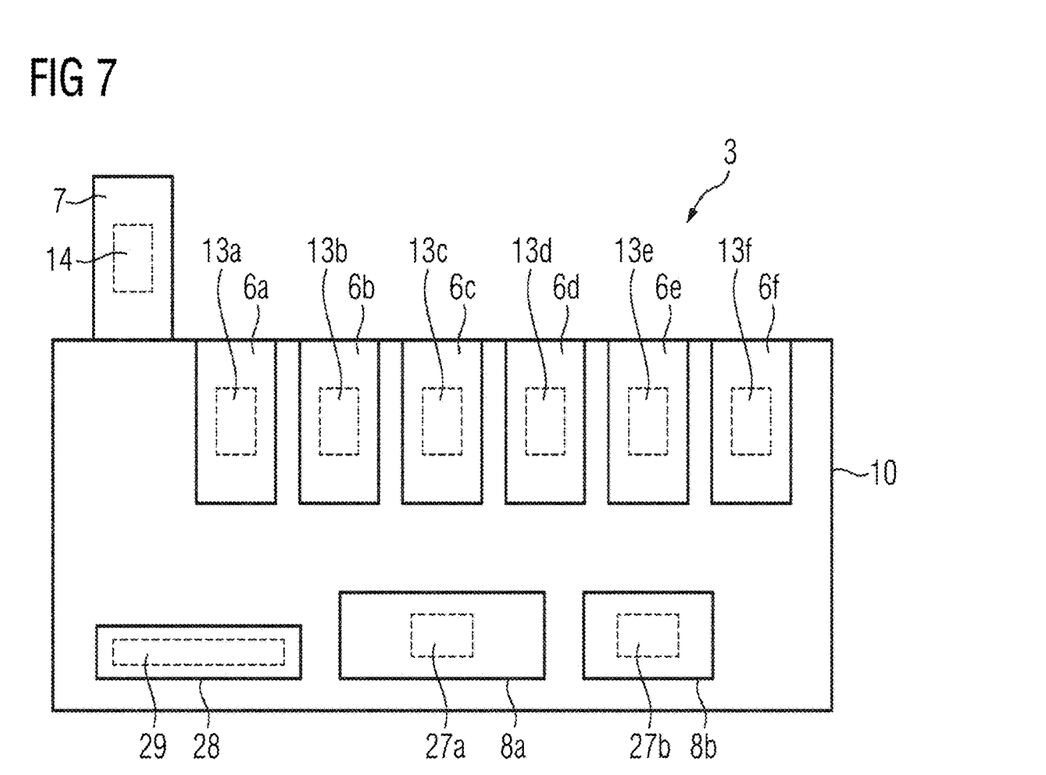
FIG. 7 shows a schematical view of a nacelle according to a second embodiment.

FIG. 7 schematically shows a second embodiment of a nacelle 3. As in the case of the first embodiment, a single second module 7 is mounted to the top of the nacelle housing 10, again comprising at least one cooling device as component 14. In other embodiments, larger numbers of second modules 7 may be provided. Furthermore, in this case, six first modules 6a, 6b, 6c, 6d, 6e, 6f comprising components 13a, 13b, 13c, 13d, 13e and 13f are provided, in particular again suspended in the frame 11, as discussed with respect to FIGS. 2 to 6. Below the first modules 6a to 6f, two third modules 8a, 8b having respective components 27a, 27b and a drive train/main shaft arrangement 28, comprising a drive train/main shaft 29, are located. The third modules 8a, 8b may be supported by the bedframe of the nacelle 3. In this case, the component 27a comprises or is a gear box, the component 27b a generator.

The first modules 6a to 6f are located and dimensioned such that a person may stand underneath the first modules 6a to 6f. A staircase or ladder to a platform and/or walkway on one side of the nacelle 3 (not shown in FIG. 7) may be provided, in particular along a nacelle sidewall, for easy access to the first modules 6a to 6f and their components 13a to 13f through respective access holes in the modules 6a to 6f.

It is further noted that the third modules 8a, 8b may also be lifted up through the access opening 20 in the top of the nacelle housing 10 by first removing the respective group of first modules 6b, 6c and 6d, or 6d, 6e and 6f, respectively.

Figure 8:
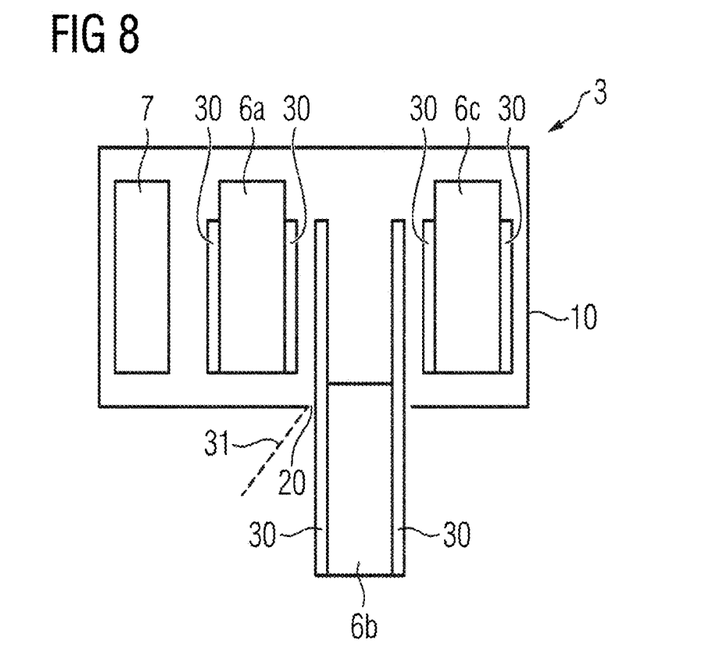
FIG. 8 shows a schematical view from above onto a third embodiment of a nacelle.

A third embodiment of the nacelle 3 is shown in a schematic view from above in FIG. 8. In this case, the first modules 6a, 6b, 6c are held in their respective mounting positions by telescopic mounting arms 30, which may be secured to the frame 11. Exemplarily, the access opening 20 is, in this case, not closable by an outer surface 12 of the first modules 6a, 6b, 6c, but by a hatch 31 only schematically indicated. Of course, the embodiment may also be modified such that an outer surface 12 closes the access opening 20 by a bearing surface 32 of the module 6a, 6b, 6c resting against a bearing surface 33 of the rim of the access opening 20 or frame opening 18, in particular via a sealing and/or damping means 24.

In FIG. 8, the access opening 20 of the first module 6b is shown open such that the telescopic arms can be extended to move the first module 6b into the receiving or removing position shown. Here, the first module 6b can be detached and lowered to the ground using a hoisting means, for example the internal crane 9. The telescopic mounting arms 30 may remain in the extended position to later receive a replacement first module 6b and can then be retracted such that the replacement first module 6b is moved into the nacelle 3 into the mounting position. The access opening 20 can then be closed by the hatch 31.

Figure 9:
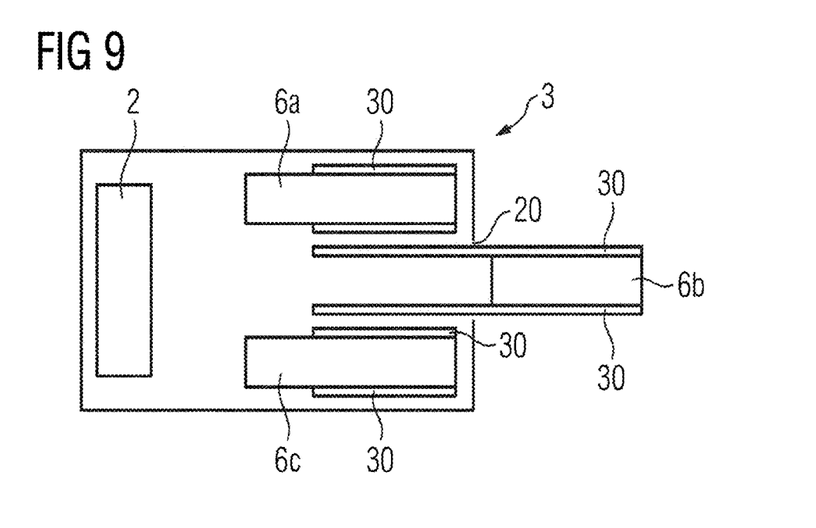
FIG. 9 shows a schematical view from above onto a fourth embodiment of a nacelle.

While in FIG. 8, the access openings 20 are provided at a side of the nacelle 3, in the slightly modified fourth embodiment of FIG. 9, the access openings 20 are provided at the back of the nacelle 3, that is, opposite to the rotor hub 4.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine, comprising multiple wind turbine blades fixed to a rotor hub, a nacelle to which the rotor hub is mounted, and a tower carrying the nacelle, wherein wind turbine components are housed in a housing of the nacelle, wherein a mounting device is provided inside the nacelle, the mounting device providing at least two module receivers, wherein at least two first modules each comprising at least one of the wind turbine components are each detachably mounted in a respective receiver, and wherein the housing comprises, for each module receivers, a closable access opening,
wherein the mounting device comprises at least one frame defining mounting positions for the first modules received by each module receiver, and
wherein the frame has upper frame openings for each module receiver and each first module has a body of smaller dimensions than the frame openings and an upper flange of dimensions larger than the frame openings, such that the first modules rest suspended in the mounting position with the flange resting on the rim of one of the frame openings.

2. The wind turbine according to claim 1, wherein each first module comprises at least one module connector for establishing a power connection and/or data connection and/or fluid connection and each module receiver comprises at least one nacelle connector such that, upon inserting a first module into the nacelle using the respective module receiver, the at last one module connector and at least one nacelle connector are automatically connected.

3. The wind turbine according to claim 1, wherein all first modules comprise an identical coupler for coupling to a least one hoist.

4. The wind turbine according to claim 3, wherein the wind turbine comprises a crane and/or a winch in the nacelle as at least one of the at least one hoist.

5. The wind turbine according to claim 1, wherein at least one of the at least two first modules is attached to the frame by detachable attachment, comprising bolts.

6. The wind turbine according to claim 5, wherein the frame is configured to hold a first module before attaching it using the detachable attachment, such that at least one bearing surface of the first module rests against a bearing surface of the frame.

7. The wind turbine according to claim 1, wherein a detachable guide for guiding a first module into a frame opening is provided.

8. The wind turbine according to claim 1, wherein each module receiver comprises a telescopic mounting arm which is prolonged in a telescopic manner to a receiving or removing position outside the nacelle and shortened to move a first module into the nacelle.

9. The wind turbine according to claim 8, wherein the closable access opening is provided at a side of the nacelle or a back of the nacelle opposite the rotor hub.

10. The turbine according to claim 1, wherein the wind turbine further comprises at least one second module mounted to the outside of the nacelle.

11. The wind turbine according to claim 1, wherein the module receiver are located in an upper part of the nacelle, wherein at least one third module, a gearbox module and/or a generator module, are placed below the first modules, supported by a bedframe of the nacelle.

12. The wind turbine according to claim 11, wherein the access opening is at the top of the nacelle such that the third modules are insertable and removable through the access opening when at least a part of the first modules are removed.

13. The wind turbine according to claim 1, wherein the access opening is closed by an outer surface of the first modules.

* * * * *